United States Patent
Park (10) Patent No.: US 8,045,275 B2
(45) Date of Patent: Oct. 25, 2011

(54) ZOOM LENS AND IMAGE PICKUP DEVICE HAVING THE SAME

(75) Inventor: Young-woo Park, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/889,523

(22) Filed: Sep. 24, 2010

(65) Prior Publication Data

US 2011/0085246 A1    Apr. 14, 2011

(30) Foreign Application Priority Data

Oct. 14, 2009 (KR) .................. 10-2009-0097739

(51) Int. Cl.
*G02B 15/14* (2006.01)

(52) U.S. Cl. ........ 359/680; 359/682; 359/683; 359/684; 359/685; 359/691; 359/717; 359/740; 359/793

(58) Field of Classification Search .................. 359/676, 359/680, 682–685, 691, 717, 740, 793
See application file for complete search history.

(56) References Cited

U.S. PATENT DOCUMENTS

| | | | | |
|---|---|---|---|---|
| 4,147,410 A * | 4/1979 | Shimomura et al. | ........... | 359/680 |
| 4,169,660 A * | 10/1979 | Nakamura | ..................... | 359/680 |
| 4,189,212 A * | 2/1980 | Mizutani et al. | .............. | 359/680 |
| 4,540,249 A * | 9/1985 | Mogami | ........................ | 359/680 |
| 4,711,534 A * | 12/1987 | Matsushita et al. | ........... | 359/680 |
| 6,917,477 B2 * | 7/2005 | Takatsuki | ....................... | 359/691 |
| 6,943,958 B2 * | 9/2005 | Ozaki et al. | .................... | 359/680 |
| 6,989,941 B2 * | 1/2006 | Tomioka | ........................ | 359/680 |
| 7,050,240 B2 * | 5/2006 | Tomioka | ........................ | 359/680 |
| 7,280,284 B2 * | 10/2007 | Ishii | .............................. | 359/680 |
| 7,359,125 B2 * | 4/2008 | Kimura et al. | ................ | 359/680 |
| 7,652,827 B2 * | 1/2010 | Taguchi et al. | ............... | 359/691 |
| 2003/0179466 A1 * | 9/2003 | Takatsuki | ....................... | 359/691 |

* cited by examiner

*Primary Examiner* — Evelyn A. Lester
(74) *Attorney, Agent, or Firm* — Drinker Biddle & Reath LLP

(57) ABSTRACT

A compact wide-angle zoom lens and an image pickup device having the same. The zoom lens includes a first lens group having a negative refractive power and a second lens group having a positive refractive power in an order from an object side to an image side, performs zooming by varying a distance between the first and second lens groups, and performs focusing by using a first lens closest to the object side in the second lens group.

18 Claims, 7 Drawing Sheets

(WIDE ANGLE POSITION)

(INTERMEDIATE POSITION)

(TELEPHOTO POSITION)

FIG. 1

(WIDE ANGLE POSITION)

(INTERMEDIATE POSITION)

(TELEPHOTO POSITION)

FIG. 3

(WIDE ANGLE POSITION)

(INTERMEDIATE POSITION)

(TELEPHOTO POSITION)

ZOOM LENS AND IMAGE PICKUP DEVICE HAVING THE SAME

CROSS-REFERENCE TO RELATED PATENT APPLICATION

This application claims the priority benefit of Korean Patent Application No. 10-2009-0097739, filed on Oct. 14, 2009, in the Korean Intellectual Property Office, the disclosure of which is incorporated herein in its entirety by reference.

BACKGROUND

1. Field of the Invention

Embodiments relate to a compact wide-angle zoom lens and an image pickup device having the same.

2. Description of the Related Art

Currently, digital cameras or video cameras including a solid state imaging device such as a charge-coupled device (CCD) or a complementary metal-oxide-semiconductor (CMOS) are popular. In particular, demand for mega-pixel camera modules is increasing and low-price digital cameras having high-pixel count and high-quality performance are being introduced. Optical devices using an imaging device such as a CCD or a CMOS, for example, digital cameras and mobile camera phones, require a compact, light and low-price zoom lens. Furthermore, demand for a wide-angle zoom lens is increasing, by which may capture a wide-angle image of a subject.

As a wide-angle zoom lens, a retrofocus-type lens including a front lens group having a negative refractive power and a rear lens group having a positive refractive power is commonly used. The retrofocus-type lens includes an asymmetric lens having a high negative refractive power and thus aberrations such as distortion and astigmatism may easily occur. In order to correct the aberrations, for example, an aspherical surface is used and thus the number of lenses is increased. Accordingly, a compact and low-price lens system may not be easily provided.

Also, when a retrofocus-type lens performs focusing from an infinite object distance to a short object distance, the height of a paraxial ray that is incident in a lens system greatly varies and thus the amount of aberration is increased. Thus, in a retrofocus-type lens, a method of correcting variations in aberration is regarded as a major issue.

SUMMARY

Embodiments include a compact wide-angle zoom lens and an image pickup device having a compact wide-angle zoom lens.

According to an embodiment, a zoom lens includes a first lens group having a negative refractive power and a second lens group having a positive refractive power in an order from an object side to an image side, that performs zooming by varying a distance between the first and second lens groups, that performs focusing by using a first lens that is closest to the object side in the second lens group, and satisfying $$1.2 \leq \frac{f_{II}}{\sqrt{f_W \cdot f_T}} \leq 1.8 \text{ and } \frac{L_T}{\sqrt{f_W \cdot f_T}} \leq 6.0,$$

where $f_W$ represents a total focal length at a wide-angle position, $f_T$ represents a total focal length at a telephoto position, $f_{II}$ represents a focal length of the second lens group, and $L_T$ represents an overall length of the zoom lens at the telephoto position.

The zoom lens may satisfy $$-0.8 \leq \frac{f_I}{f_{II}} \leq -0.65,$$

where $f_I$ represents a focal length of the first lens group.

The first lens in the second lens group may include a positive lens having a shape convex toward the object side or a biconvex shape.

The first lens group may include two negative lenses each having a meniscus shape convex toward the object side.

The first lens group may include first and second negative lenses each having a meniscus shape convex toward the object side, a first positive lens and a third negative lens, and a second positive lens having a biconvex shape.

The second lens group may include a positive lens having a biconvex shape, first and second doublet lenses, and a negative lens in an order from the object side to the image side.

The second lens group may include a stop.

When the first lens in the second lens group performs focusing, the first lens group may be fixed.

The second lens group may have at least one aspherical surface.

According to another embodiment, an image pickup device includes a zoom lens and an imaging device that receives an image formed by the zoom lens. The zoom lens includes a first lens group having a negative refractive power and a second lens group having a positive refractive power in an order from an object side to an image side, performs zooming by varying a distance between the first and second lens groups, performs focusing by using a first lens closest to the object side in the second lens group, and satisfies $$1.2 \leq \frac{f_{II}}{\sqrt{f_W \cdot f_T}} \leq 1.8 \text{ and } \frac{L_T}{\sqrt{f_W \cdot f_T}} \leq 6.0,$$

where $f_W$ represents a total focal length at a wide-angle position, $f_T$ represents a total focal length at a telephoto position, $f_{II}$ represents a focal length of the second lens group, and $L_T$ represents an overall length of the zoom lens at the telephoto position.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, embodiments be described in detail with reference to the attached drawings.

A zoom lens according to an embodiment includes a first lens group having a negative refractive power and a second lens group having a positive refractive power in the order from an object side. When an object distance varies from infinity to a short distance, a lens of the second lens group closest to the object side performs focusing.

Figure 1:
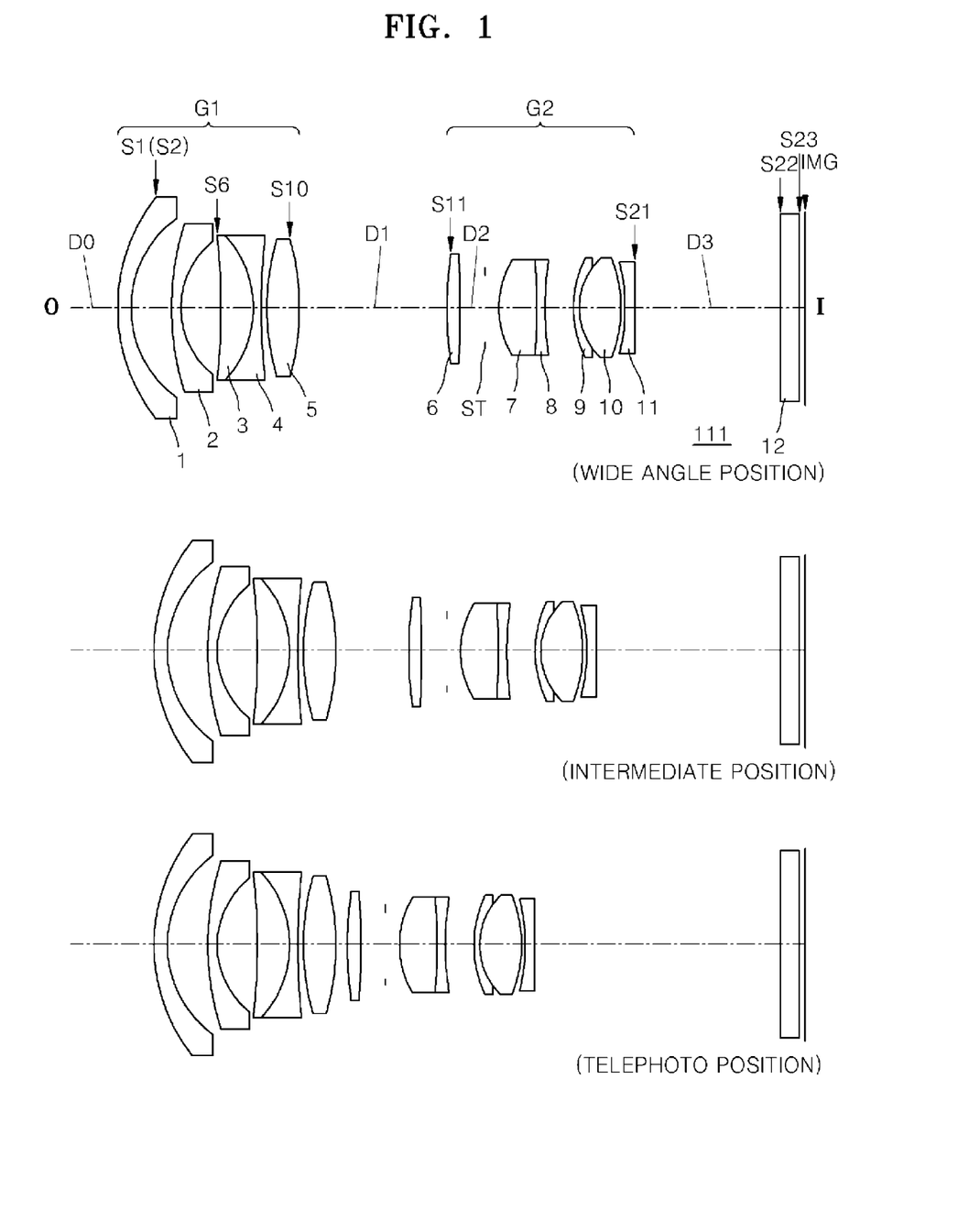
FIG. 1 is a structural diagram of a zoom lens according to a first embodiment.

FIG. 1 is a structural diagram of a zoom lens 111 according to a first embodiment.

Referring to FIG. 1, the zoom lens 111 includes a first lens group G1 and a second lens group G2. The first lens group G1 has a negative refractive power and may include a plurality of lenses. For example, the first lens group G1 may include first through fifth lenses 1 through 5. The first lens group G1 may include at least one doublet lens and may also include at least one lens of which a surface has a meniscus shape convex toward an object side O. For example, the first lens group G1 may include first and second negative lenses as the first and second lenses 1 and 2, each of which having a surface having a meniscus shape convex toward the object side O, a first positive lens and a third negative lens as the third and fourth lenses 3 and 4, and a second positive lens having a biconvex shape as the fifth lens 5. The first positive lens and the third negative lens, i.e. the third and fourth lenses 3 and 4, may form a doublet lens.

The second lens group G2 may include a plurality of lenses. For example, the second lens group G2 may include sixth through eleventh lenses 6, 7, 8, 9, 10, and 11. The second lens group G2 may include a stop ST. A filter 12 may be included at an image side I of the eleventh lens 11.

The second lens group G2 performs focusing by using a lens closest to the object side O, that is, the sixth lens 6. The sixth lens 6 may be a positive lens having a shape convex toward the object side O or a biconvex shape. For example, the second lens group G2 may include, from the object side O to the image side I, a biconvex positive lens as the sixth lens 6, first and second doublet lenses as the seventh and eighth lenses 7 and 8 and the ninth and tenth lenses 9 and 10, and a negative lens as the eleventh lens 11. The stop ST may be interposed between the biconvex positive lens 6 and the first doublet lens (lenses 7 and 8). The first doublet lens may include two positive lenses. The second lens group G2 may have at least one aspherical surface.

According to an embodiment, in order to ensure a sufficient back focal length, if an object moves from infinity to a short distance, the sixth lens 6, that is, a positive lens and the lens closest to the object side O in the second lens group G2, moves to perform inner focusing.

When zooming is performed from a wide-angle position to a telephoto position, the distance D1 between the first and second lens groups G1 and G2 varies. In more detail, the distance D1 between the first and second lens groups G1 and G2 may be decreased.

The zoom lens 111 may satisfy Expressions 1 and 2.

$$1.2 \leq \frac{f_{II}}{\sqrt{f_W \cdot f_T}} \leq 1.8 \qquad [\text{Expression 1}]$$

$$\frac{L_T}{\sqrt{f_W \cdot f_T}} \leq 6.0 \qquad [\text{Expression 2}]$$

Here, $f_W$ represents a total focal length at a wide-angle position, $f_T$ represents a total focal length at a telephoto position, $f_{II}$ represents a focal length of the second lens group G2, and $L_T$ represents an overall length of the zoom lens 111 at the telephoto position. Expression 1 represents a ratio of the focal length of the second lens group G2 with respect to the total focal length at the wide-angle position and the total focal length at the telephoto position. If the ratio exceeds the upper limit, distortion and comma at the wide-angle position and spherical aberration and comma at the telephoto position may not be easily corrected. If the ratio is lower than the lower limit, the size of the first lens group G1 is increased and the size of the entire zoom lens is also increased.

Expression 2 represents a ratio of the overall length of the zoom lens 111 at the telephoto position with respect to the total focal length at the wide-angle position and the total focal length at the telephoto position. If the ratio is out of the range of Expression 2, the overall length of the zoom lens 111 is increased.

Expression 3 represents a ratio of a focal length of the first lens group G1 ($f_I$) with respect to the focal length of the second lens group G2 ($f_{II}$).

$$-0.8 \leq \frac{f_I}{f_{II}} \leq -0.65 \qquad [\text{Expression 3}]$$

If the value of $f_I/f_{II}$ exceeds the upper limit, a refractive power of the first lens group G1 is higher than that of the second lens group G2 and thus distortion and field curvature may not be easily corrected. If the value of $f_I/f_{II}$ is lower than the lower limit, the refractive power of the first lens group G1 is lower than that of the second lens group G2 and thus the size of a negative lens at the object side O in the first lens group G1 is increased and the size of the entire zoom lens 111 is also increased.

The zoom lens 111 may be appropriately used as a compact wide-angle zoom lens having a wide viewing angle greater than about 80° at the wide-angle position, an aperture ratio of 1:4, and a zoom ratio of about 2×. Also, focusing may be simply performed by using a lens that is the closest to the object side O in the second lens group G2.

Meanwhile, in the present embodiments, an aspherical surface is defined as described below.

When an optical axis direction is an x axis, a direction perpendicular to the optical axis direction is a y axis, and a light proceeding direction is a positive direction, an aspherical shape may be represented by Expression 4. In Expression 4, x represents a distance from a vertex of a lens in the optical axis direction, y represents a distance in the direction perpendicular to the optical axis direction, K represents a conic constant, A, B, C and D represent aspherical coefficients, and c represents an inverse number of a vertex radius of curvature (1/R).

$$x = \frac{cy^2}{1 + \sqrt{1 - (K+1)c^2y^2}} + Ay^4 + By^6 + Cy^8 + Dy^{10} \qquad [\text{Expression 4}]$$

Various embodiments will now be described.

Figure 3:
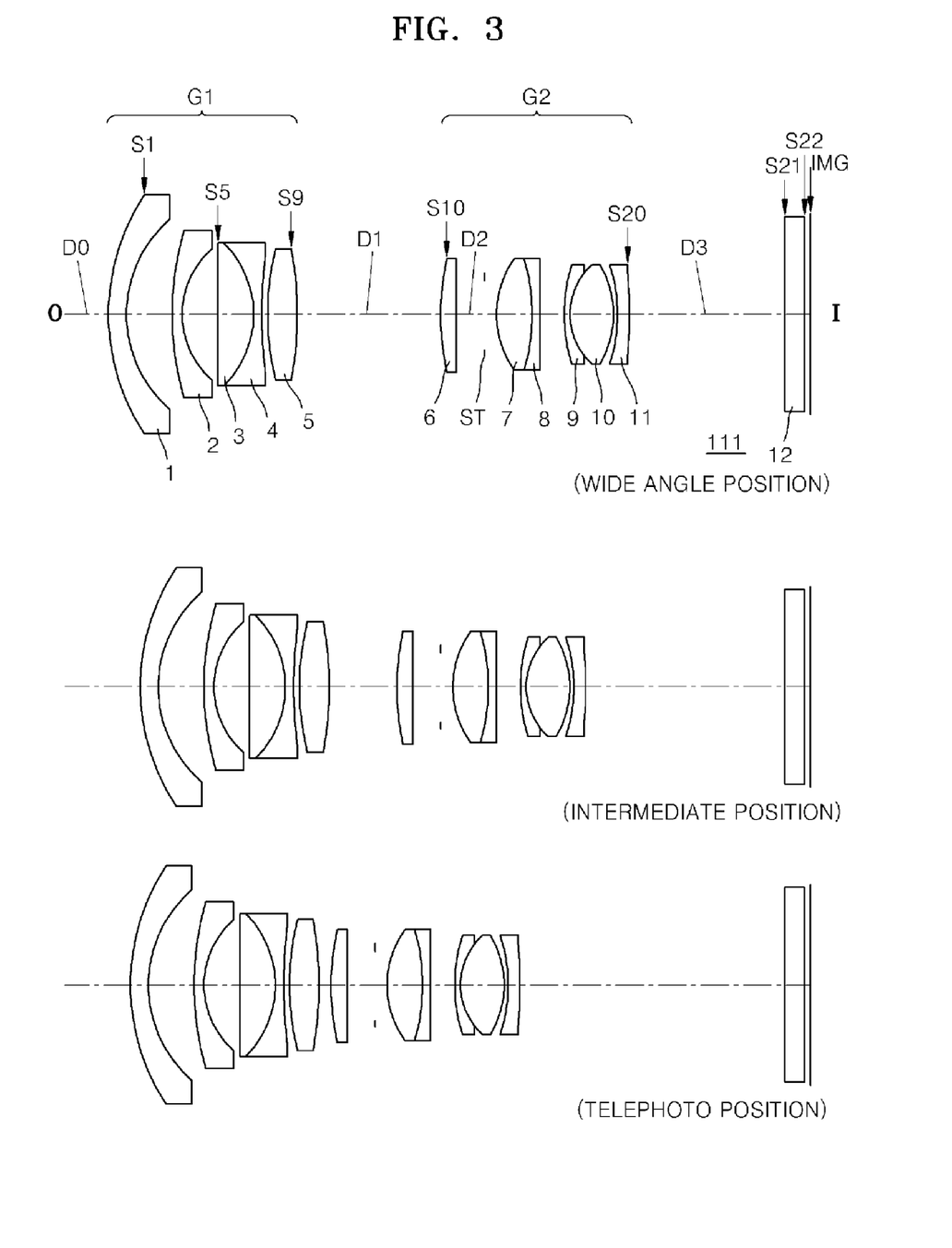
FIG. 3 is a structural diagram of a zoom lens according to a second embodiment.

In FIGS. 1 and 3, a straight line at the right most side represents the position of an image plane and an infrared (IR) blocking filter or cover glass of an imaging device is disposed at the object side O of the image plane. Hereinafter, lens data, aspherical surface data, a focal length f, an F number Fno, a viewing angle 2ω, a refractive index Nd, an Abbe number Vd, and variable distances D0, D1, D2 and D3 between lenses of a zoom lens according to first and second embodiments of the present invention will be provided. ASP represents an aspherical surface.

Embodiment 1

| | f: 12.3~16.5~23.3 | Fno: 4.10 | 2ω: 100.2°~81.9°~62.7° | |
|---|---|---|---|---|
| Lens Surface | Radius of Curvature | Thickness | Nd | Vd |
| OBJ | INFINITY | D0 | | |
| S1 | 28.27100 | 1.850000 | 1.90366 | 31.32 |
| S2 | 17.02300 | 0.050000 | 1.51358 | 51.54 |
| S3 | 13.44200 | 5.900000 | | |
| | ASP: | | | |
| | K: −1.000000 | | | |
| | A: 0.125342E−04 | B: 0.482093E−08 | C: −0.347189E−09 | D: 0.280520E−12 |
| S4 | 41.09900 | 1.500000 | 1.83481 | 42.7200 |
| S5 | 13.60000 | 5.770000 | | |
| S6 | −110.00000 | 4.850000 | 1.56732 | 42.84 |
| S7 | −16.89800 | 1.200000 | 1.80420 | 46.50 |
| S8 | 96.83000 | 0.800000 | | |
| S9 | 39.62400 | 4.740000 | 1.68893 | 31.16 |
| S10 | −39.62400 | D1 | | |
| S11 | 62.78900 | 2.220000 | 1.71300 | 53.94 |
| S12 | −113.00000 | D2 | | |
| ST | INFINITY | 1.890000 | | |
| S14 | 14.15300 | 5.800000 | 1.51823 | 58.96 |
| S15 | −43.75100 | 0.900000 | 1.83481 | 42.72 |
| S16 | 31.24000 | 4.320000 | | |
| S17 | 16.57000 | 1.000000 | 1.90366 | 31.32 |
| S18 | 10.70000 | 6.200000 | 1.49700 | 81.61 |
| S19 | −19.00000 | 0.620000 | | |
| S20 | −34.84000 | 1.200000 | 1.80610 | 40.74 |
| | ASP: | | | |
| | K: 1.000000 | | | |
| | A: −.774621E−04 | B: −.196887E−06 | C: −.162436E−08 | D: 0.000000E+00 |
| S21 | 171.50000 | D3 | | |
| S22 | INFINITY | 2.790000 | 1.51680 | 64.20 |
| S23 | INFINITY | 1.000000 | | |
| IMG | INFINITY | | | |

A first lens 1 in a zoom lens 111 illustrated in FIG. 1 may be a hybrid lens. Variable distances at a wide-angle position, an intermediate position, and a telephoto position of the zoom lens 111 at an infinite object focus distance and a short object focus distance illustrated in FIG. 1 are as follows.

| Variable Distance | Wide-angle Position (Inf) | Intermediate Position (Inf) | Telephoto Position (Inf) | Wide-angle Position (Short Distance) | Intermediate Position (Short Distance) | Telephoto Position (Short Distance) |
|---|---|---|---|---|---|---|
| D0 | INFINITY | INFINITY | INFINITY | 180.00000 | 173.27171 | 179.55702 |
| D1 | 21.94721 | 10.89371 | 1.44640 | 24.02628 | 12.97278 | 3.52547 |
| D2 | 3.71354 | 3.71354 | 3.71354 | 1.63447 | 1.63447 | 1.63447 |
| D3 | 21.79509 | 27.33571 | 36.30622 | 21.79509 | 27.33571 | 36.30622 |

Figure 2A:
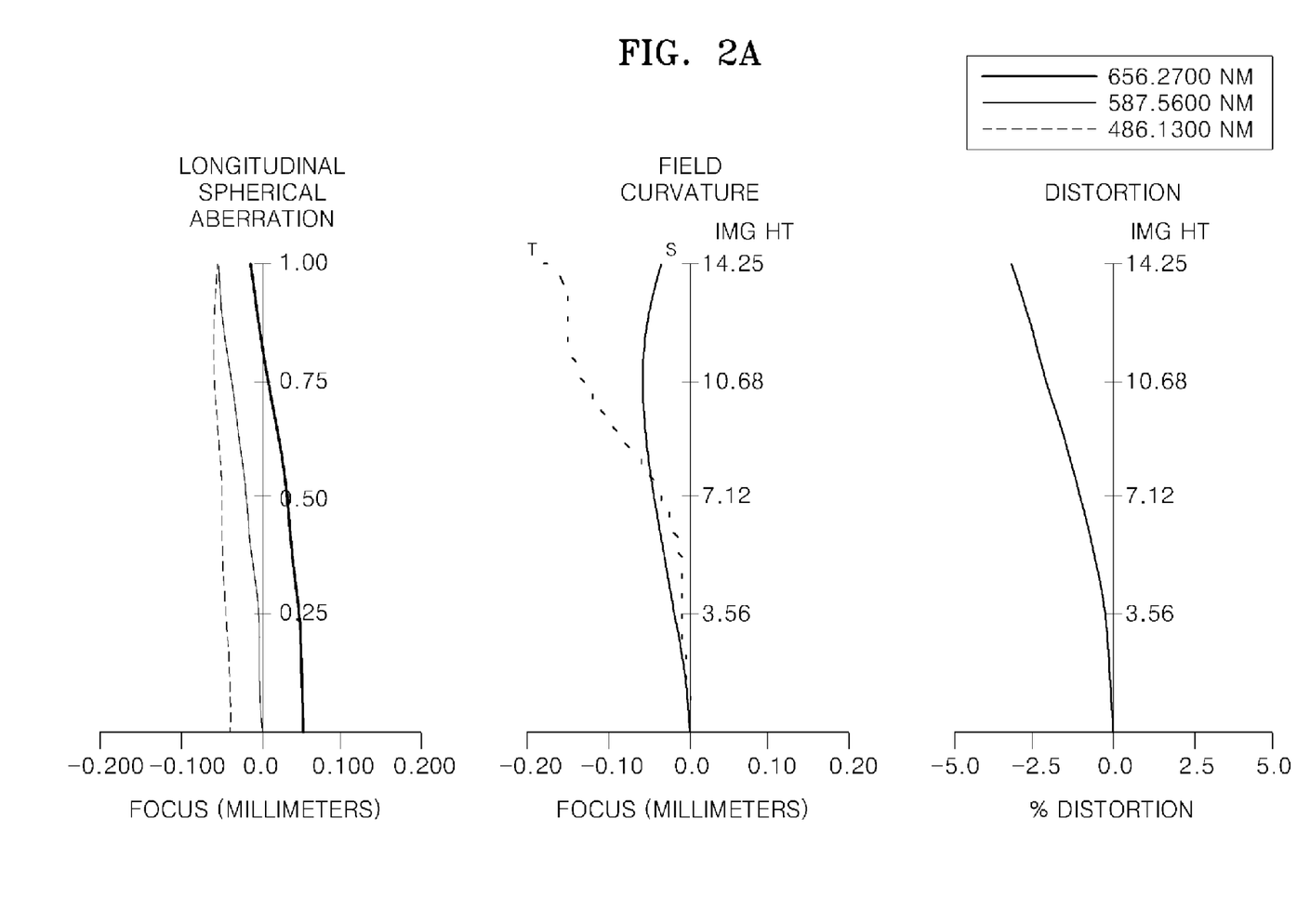
FIGS. 2A and 2B illustrate graphs showing longitudinal spherical aberration, field curvature and distortion respectively at a wide-angle position and a telephoto position of the zoom lens illustrated in FIG. 1.
Figure 2B:
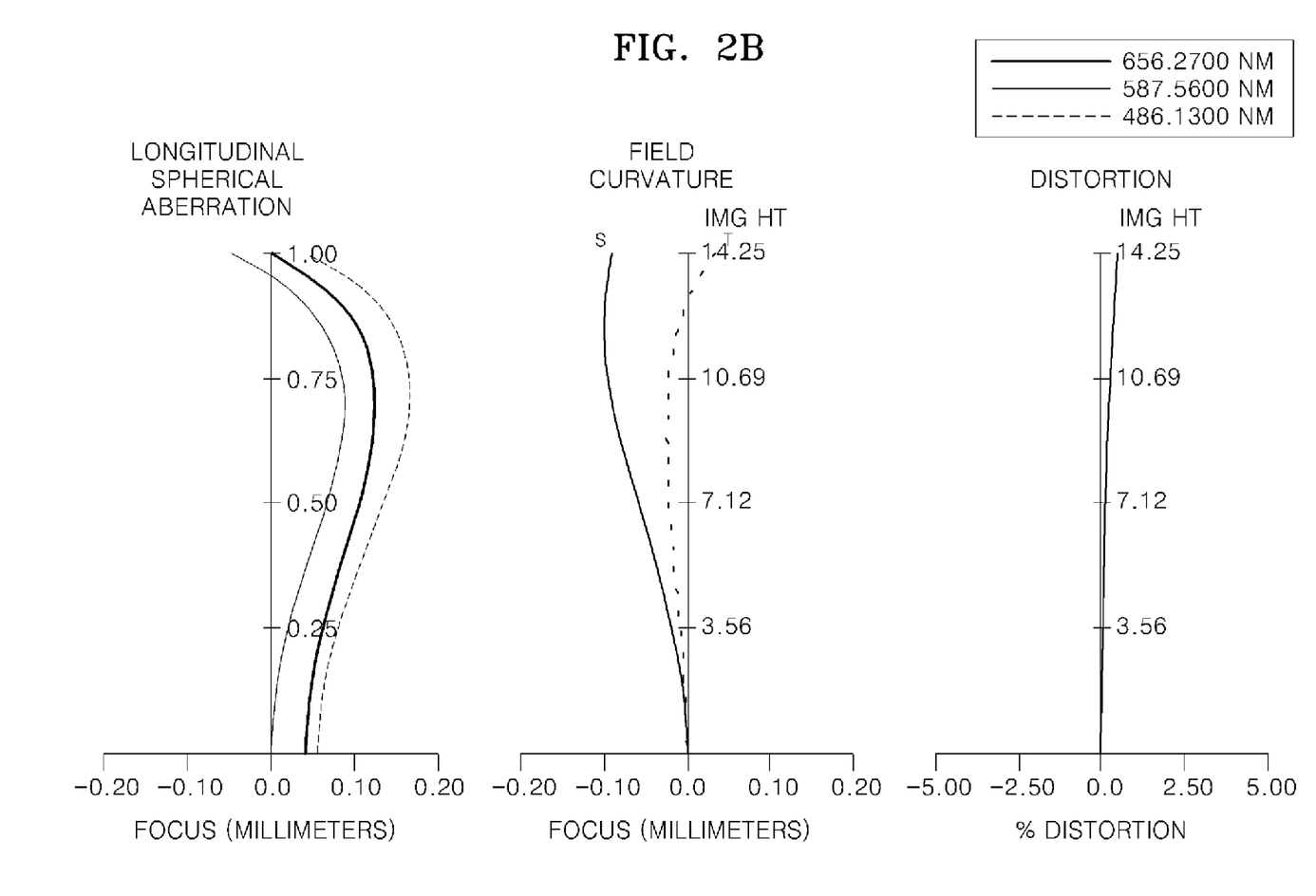

FIGS. 2A and 2B illustrate graphs showing longitudinal spherical aberration, field curvature, and distortion respectively at the wide-angle position and the telephoto position of the zoom lens 111 illustrated in FIG. 1.

In FIGS. 2A and 2B, a vertical axis of graphs of longitudinal spherical aberration represents an F number and the graphs show longitudinal spherical aberration with respect to 656.27 nm, 587.56 nm, and 486.13 nm. In graphs of field curvature, a vertical axis represents a maximum image height IH, a solid line represents sagittal field curvature S, and a dashed line represents tangential field curvature T. In graphs of distortion, a vertical axis represents a maximum image height IH.

Embodiment 2

FIG. 3 is a structural diagram of a zoom lens 111 according to a second embodiment.

| Lens Surface | Radius of Curvature | Thickness | Nd | Vd |
|---|---|---|---|---|
| | f: 12.0~16.55~23.19 | Fno: 4.10 | 2ω: 101.8°~81.9°~63.1° | |
| OBJ | INFINITY | D0 | | |
| S1 | 31.10000 | 2.500000 | 1.80470 | 40.95 |
| S2 | 15.02500 | 6.600000 | | |
| | ASP: | | | |
| | K: −1.000000 | | | |
| | A: 0.117858E−04 | B: −0.446786E−08 | C: −0.101693E−09 | D: −0.349263E−13 |
| S3 | 40.84000 | 1.500000 | 1.90366 | 313200 |
| S4 | 13.00000 | 5.170000 | | |
| S5 | −141.40000 | 4.900000 | 1.56732 | 42.84 |
| S6 | −15.38000 | 1.200000 | 1.77250 | 49.62 |
| S7 | 90.00000 | 0.810000 | | |
| S8 | 37.71600 | 4.280000 | 1.72825 | 28.32 |
| S9 | −48.47000 | D1 | | |
| S10 | 52.71000 | 2.170000 | 1.74330 | 49.22 |
| S11 | −247.80000 | D2 | | |
| ST | INFINITY | 1.920000 | | |
| S13 | 14.27000 | 5.000000 | 1.51823 | 58.96 |
| S14 | −27.05000 | 0.920000 | 1.77250 | 49.62 |
| S15 | 71.38000 | 3.520000 | | |
| S16 | 22.30000 | 1.000000 | 1.90366 | 31.32 |
| S17 | 10.57000 | 6.200000 | 1.49700 | 81.61 |
| S18 | −15.81400 | 0.670000 | | |
| S19 | −23.28000 | 1.570000 | 1.80470 | 40.95 |
| | ASP: | | | |
| | K: 1.000000 | | | |
| | A: −0.589604E−04 | B: −0.129665E−06 | C: −0.295353E−08 | D: 0.000000E+00 |
| S20 | −125.20000 | D3 | | |
| S21 | INFINITY | 2.790000 | 1.51680 | 64.20 |
| S22 | INFINITY | 1.000000 | | |
| IMG | INFINITY | | | |

Variable distances at a wide-angle position, an intermediate position, and a telephoto position of the zoom lens 111 at an infinite object focus distance and a short object focus distance illustrated in FIG. 3 are as follows.

| Variable Distance | Wide-angle Position (Inf) | Intermediate Position (Inf) | Telephoto Position (Inf) | Wide-angle Position (Short Distance) | Intermediate Position (Short Distance) | Telephoto Position (Short Distance) |
|---|---|---|---|---|---|---|
| D0 | INFINITY | INFINITY | INFINITY | 165.30458 | 168.35420 | 180.00000 |
| D1 | 20.58763 | 9.85571 | 1.74991 | 22.39294 | 11.66102 | 3.55522 |
| D2 | 3.95531 | 3.95531 | 3.95531 | 2.15000 | 2.15000 | 2.15000 |
| D3 | 22.24374 | 28.58584 | 37.84170 | 22.24374 | 28.58584 | 37.84170 |

Figure 4A:
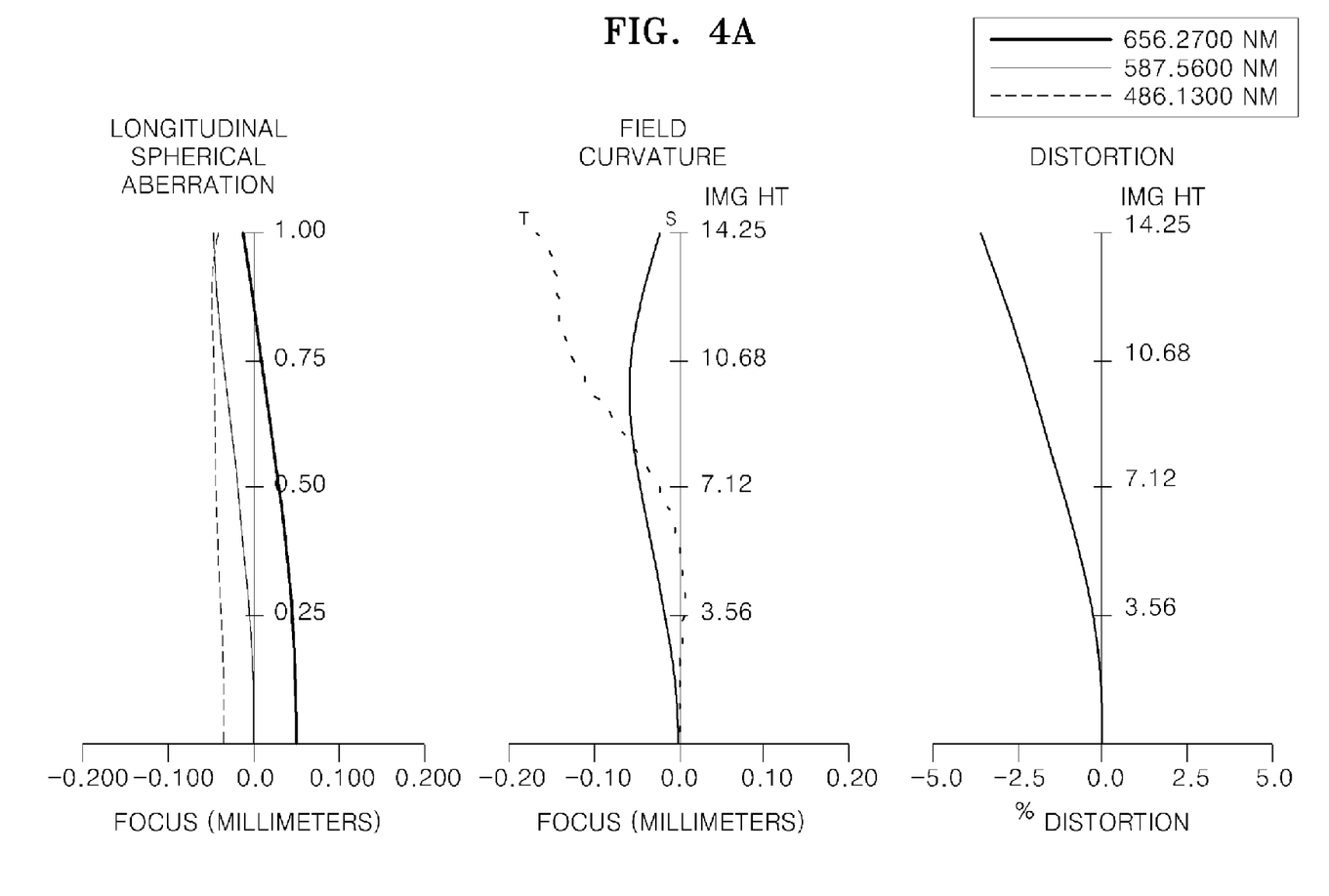
FIGS. 4A and 4B illustrate graphs showing longitudinal spherical aberration, field curvature and distortion respectively at a wide-angle position and a telephoto position of the zoom lens illustrated in FIG. 3.
Figure 4B:
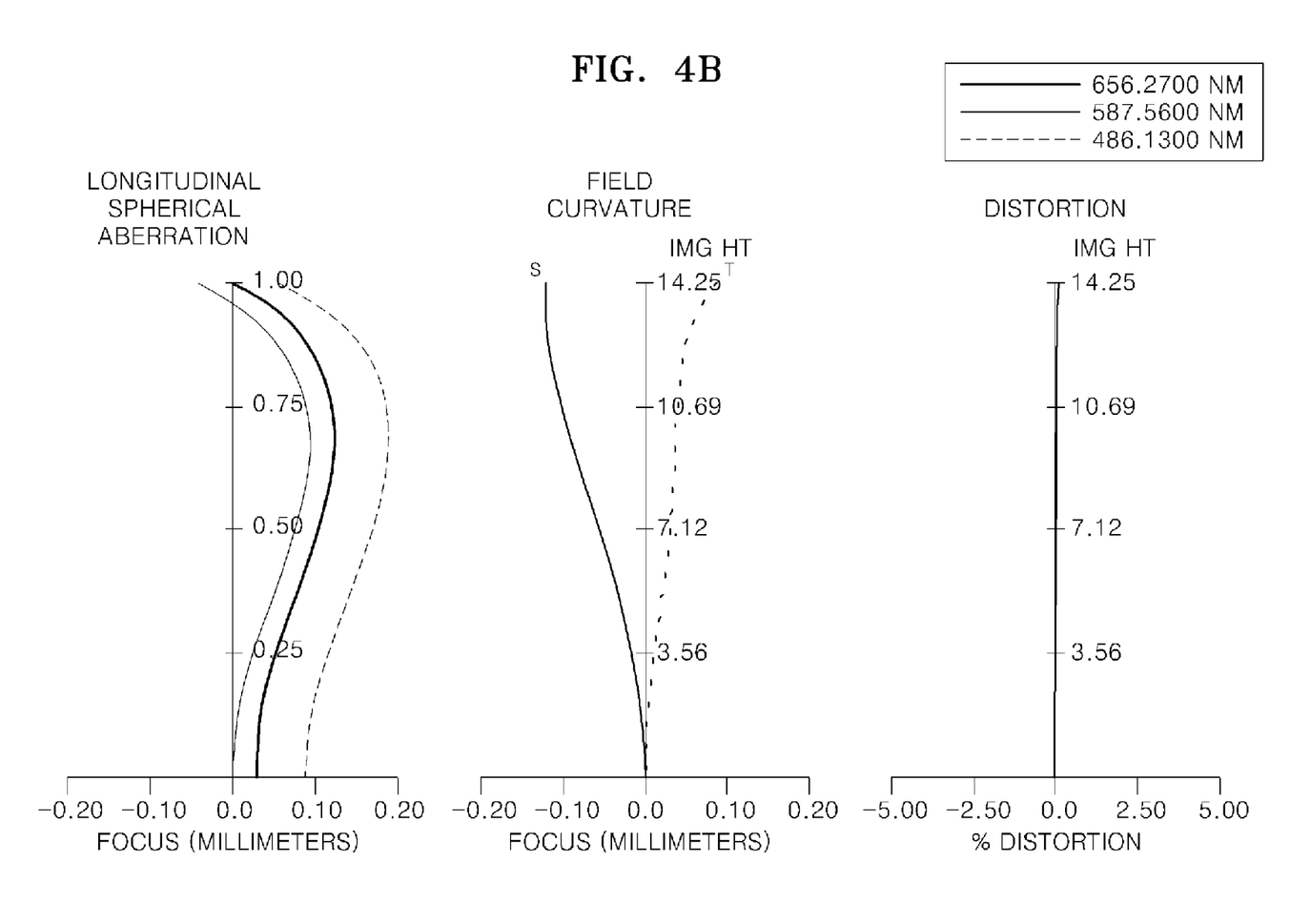

FIGS. 4A and 4B illustrate graphs showing longitudinal spherical aberration, field curvature, and distortion respectively at the wide-angle position and the telephoto position of the zoom lens 111 illustrated in FIG. 3.

The following table shows that the first and second embodiments satisfy Expressions 1 through 3.

| | Expression 1 | Expression 2 | Expression 3 |
|---|---|---|---|
| First Embodiment | 1.57 | 5.67 | −0.76 |
| Second Embodiment | 1.53 | 5.83 | −0.72 |

A zoom lens according to an embodiment may have a wide angle and a compact size. Also, the zoom lens may be appropriately used in image pickup devices using a solid state imaging device such as a charge-coupled device (CCD) or a complementary metal-oxide-semiconductor (CMOS), for example, digital still cameras, video cameras and cameras for portable terminals.

Figure 5:
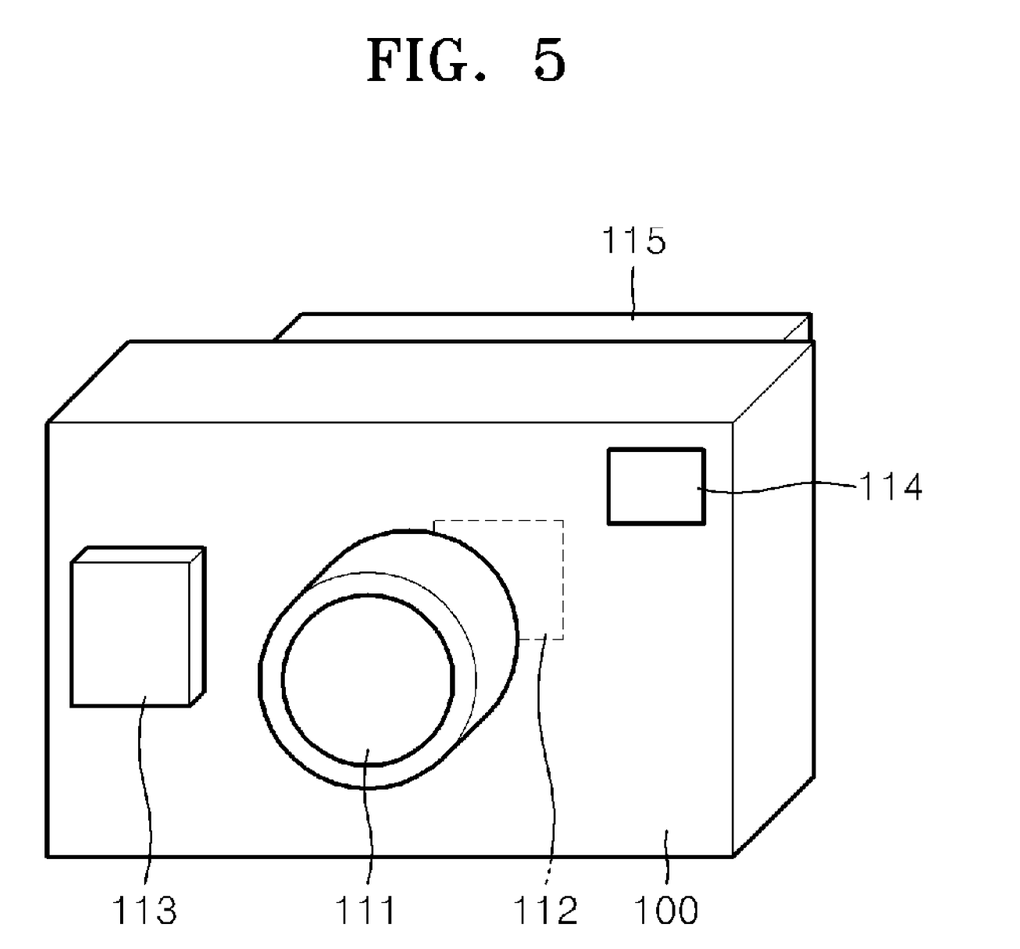
FIG. 5 illustrates an image pickup device according to an embodiment.

FIG. 5 illustrates an image pickup device 100 according to an embodiment.

Referring to FIG. 5, the image pickup device includes the zoom lens 111 illustrated in FIG. 1 or 3, and an imaging device 112 for receiving an image formed by the zoom lens 111. The image pickup device may include a recording element 113 for recording data corresponding to a subject image that is photoelectrically converted by the imaging device 112, a view finder 114 for viewing the subject image, and a display unit 115 for displaying the subject image. The view finder 114 and the display unit 115 are separately included in FIG. 5. However, alternatively, only the display unit 115 may be included without including the view finder 114. Although FIG. 5 illustrates a camera as an example of an image pickup device 100, the invention is not limited thereto and may be applied to various optical devices in addition to the camera. As such, a compact and low-price optical device capable of capturing a bright image at a wide angle may be provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While the invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A zoom lens comprising a first lens group having a negative refractive power and a second lens group having a positive refractive power in an order from an object side to an image side, that performs zooming by varying a distance between the first and second lens groups, that performs focusing by using a first lens that is closest to the object side in the second lens group, and satisfying:

$$1.2 \leq \frac{f_{II}}{\sqrt{f_W \cdot f_T}} \leq 1.8$$

and $$\frac{L_T}{\sqrt{f_W \cdot f_T}} \leq 6.0,$$

where $f_W$ represents a total focal length at a wide-angle position, $f_T$ represents a total focal length at a telephoto position, $f_{II}$ represents a focal length of the second lens group, and $L_T$ represents an overall length of the zoom lens at the telephoto position.

2. The zoom lens of claim 1, wherein the zoom lens satisfies:

$$-0.8 \leq \frac{f_I}{f_{II}} \leq -0.65,$$

where $f_I$ represents a focal length of the first lens group.

3. The zoom lens of claim 1, wherein the first lens in the second lens group comprises a positive lens having a shape convex toward the object side or a biconvex shape.

4. The zoom lens of claim 1, wherein the first lens group comprises two negative lenses each having a meniscus shape convex toward the object side.

5. The zoom lens of claim 1, wherein the first lens group comprises first and second negative lenses each having a meniscus shape convex toward the object side, a first positive lens and a third negative lens, and a second positive lens having a biconvex shape.

6. The zoom lens of claim 1, wherein the second lens group comprises a positive lens having a biconvex shape, first and second doublet lenses, and a negative lens in an order from the object side to the image side.

7. The zoom lens of claim 1, wherein the second lens group comprises a stop.

8. The zoom lens of claim 1, wherein, when the first lens in the second lens group performs focusing, the first lens group is fixed.

9. The zoom lens of claim 1, wherein the second lens group has at least one aspherical surface.

10. An image pickup device comprising:
a zoom lens; and
an imaging device that receives an image formed by the zoom lens,
wherein the zoom lens comprises a first lens group having a negative refractive power and a second lens group having a positive refractive power in an order from an object side to an image side, performs zooming by varying a distance between the first and second lens groups, performs focusing by using a first lens closest to the object side in the second lens group, and satisfies:

$$1.2 \leq \frac{f_{II}}{\sqrt{f_W \cdot f_T}} \leq 1.8$$

and $$\frac{L_T}{\sqrt{f_W \cdot f_T}} \leq 6.0,$$

where $f_W$ represents a total focal length at a wide-angle position, $f_T$ represents a total focal length at a telephoto position, $f_{II}$ represents a focal length of the second lens group, and $L_T$ represents an overall length of the zoom lens at the telephoto position.

11. The image pickup device of claim 10, wherein the zoom lens satisfies:

$$-0.8 \leq \frac{f_I}{f_{II}} \leq -0.65,$$

where $f_I$ represents a focal length of the first lens group.

12. The image pickup device of claim 10, wherein the first lens in the second lens group comprises a positive lens having a shape convex toward the object side or a biconvex shape.

13. The image pickup device of claim 10, wherein the first lens group comprises two negative lenses each having a meniscus shape convex toward the object side.

14. The image pickup device of claim 10, wherein the first lens group comprises first and second negative lenses each having a meniscus shape convex toward the object side, a first positive lens and a third negative lens, and a second positive lens having a biconvex shape.

15. The image pickup device of claim 10, wherein the second lens group comprises a positive lens having a biconvex shape, first and second doublet lenses, and a negative lens in an order from the object side to the image side.

16. The image pickup device of claim 10, wherein the second lens group comprises a stop.

17. The image pickup device of claim 10, wherein, when the first lens in the second lens group performs focusing, the first lens group is fixed.

18. The image pickup device of claim 10, wherein the second lens group has at least one aspherical surface.

* * * * *